(12) United States Patent
Granger et al.

(10) Patent No.: US 7,280,732 B2
(45) Date of Patent: Oct. 9, 2007

(54) TRANSITION ASSEMBLY FOR HIGH DENSITY OPTICAL FIBER APPLICATIONS AND A METHOD OF MAKING THE SAME

(75) Inventors: Russell J. Granger, Hickory, NC (US); Joseph L. Kaminski, Hickory, NC (US)

(73) Assignee: US Conec, Ltd., Hickory, NC (US)

( * ) Notice: Subject to any disclaimer, the term of this patent is extended or adjusted under 35 U.S.C. 154(b) by 247 days.

(21) Appl. No.: 11/074,116

(22) Filed: Mar. 7, 2005

(65) Prior Publication Data

US 2006/0198595 A1    Sep. 7, 2006

(51) Int. Cl.
*G02B 6/00* (2006.01)
*G02B 6/44* (2006.01)

(52) U.S. Cl. .............. 385/137; 385/114; 385/134; 385/136

(58) Field of Classification Search ............... 385/134, 385/136, 137, 114
See application file for complete search history.

(56) References Cited

U.S. PATENT DOCUMENTS 6,985,665 B2 * 1/2006 Baechtle .................. 385/136

* cited by examiner

*Primary Examiner*—Frank G. Font
*Assistant Examiner*—Michael P. Mooney
(74) *Attorney, Agent, or Firm*—Michael L. Leetzow, P.A.

(57) ABSTRACT

A transition assembly is provided that has a base with two sides and a plurality of optical fibers attached to each of the two sides. The optical fibers are attached to the base, with a protective covering over the optical fibers. The optical fibers are in a ribbonized format at one end of the transition assembly and in an individual format at the other end. The individual optical fibers may have protective tubes disposed thereon for protection.

18 Claims, 2 Drawing Sheets

TRANSITION ASSEMBLY FOR HIGH DENSITY OPTICAL FIBER APPLICATIONS AND A METHOD OF MAKING THE SAME

The present invention relates to a high density transition assembly for fanning out optical fibers, and more particularly, an assembly that allows a higher density of optical fibers to be transitioned from an optical fiber ribbon to individual optical fibers and a method for making the same.

There are prior art transition assemblies for fanning out optical fibers. However, each of the prior art transition assemblies do not allow for a higher density of optical fibers to be transitioned in the shrinking areas available for such transitioning. The prior art transition assemblies generally allow for only twelve fibers to be transitioned using a single assembly.

Accordingly, the present invention is directed to a transition assembly that substantially obviates one or more of the problems and disadvantages in the prior art. Additional features and advantages of the invention will be set forth in the description that follows, and in part will be apparent from the description, or may be learned by practice of the invention. The objectives and other advantages of the invention will be realized and attained by the apparatus and process particularly pointed out in the written description and claims, as well as the appended drawings.

SUMMARY OF THE INVENTION

To achieve these and other advantages and in accordance with the purpose of the invention as embodied and broadly described herein, the invention is directed to a transition assembly for optical fibers that includes a base having two sides, a plurality of optical fibers attached to each of the two sides of the base, the plurality of optical fibers attached to the each side of the base having a first portion being in a ribbon format and a second portion being individual separated optical fibers, protective tubes covering each the individual separated optical fibers, and a protective covering applied to each side of the base member and optical fibers.

In another aspect, the invention provides for a method of fanning out optical fibers including the steps of providing a first plurality of optical fibers having a length, the first plurality of optical fibers being individual optical fibers along a first portion of the length and an optical fiber ribbon along a second portion of the length, providing a second plurality of optical fibers having a length, the second plurality of optical fibers being individual optical fibers along a first portion of the length and an optical fiber ribbon along a second portion of the length, attaching at least a portion of the first plurality of optical fibers to a first side of a base member such that at least a portion of the individual fibers and at least a portion of the optical fiber ribbon is disposed on the first side of the base, attaching at least a portion of the second plurality of optical fibers to a second side of a base member such that at least a portion of the individual fibers and at least a portion of the optical fiber ribbon is disposed on the second side of the base, and covering the optical fibers with a protective covering.

In yet another aspect, the present invention provides for transition assembly for optical fibers that includes a base having two sides, a plurality of optical fibers attached to each of the two sides of the base, the plurality of optical fibers attached to the each side of the base having a first portion being in a ribbon format and a second portion being individual separated optical fibers, and a protective covering applied to each side of the base member and optical fibers.

In another aspect, the invention is directed to a transition assembly for optical fibers that includes base having two sides, a first plurality of optical fibers attached to one of the two sides of the base, the plurality of optical fibers attached to the each side of the base having a first portion being in a ribbon format and a second portion being individual separated optical fibers, a second plurality of optical fibers attached to the first plurality of optical fibers, the second plurality of optical fibers having a first portion being in a ribbon format and a second portion being individual separated optical fibers, and a protective covering applied to the second plurality of optical fibers.

It is to be understood that the foregoing general description and the following detailed description are exemplary and explanatory and are intended to provide further explanation of the invention as claimed.

The accompanying drawings are included to provide a further understanding of the invention and are incorporated in and constitute a part of the specification. The drawings illustrate several embodiments of the invention and together with the description serve to explain the principles of the invention.

DETAILED DESCRIPTION OF THE INVENTION

Figure 1:
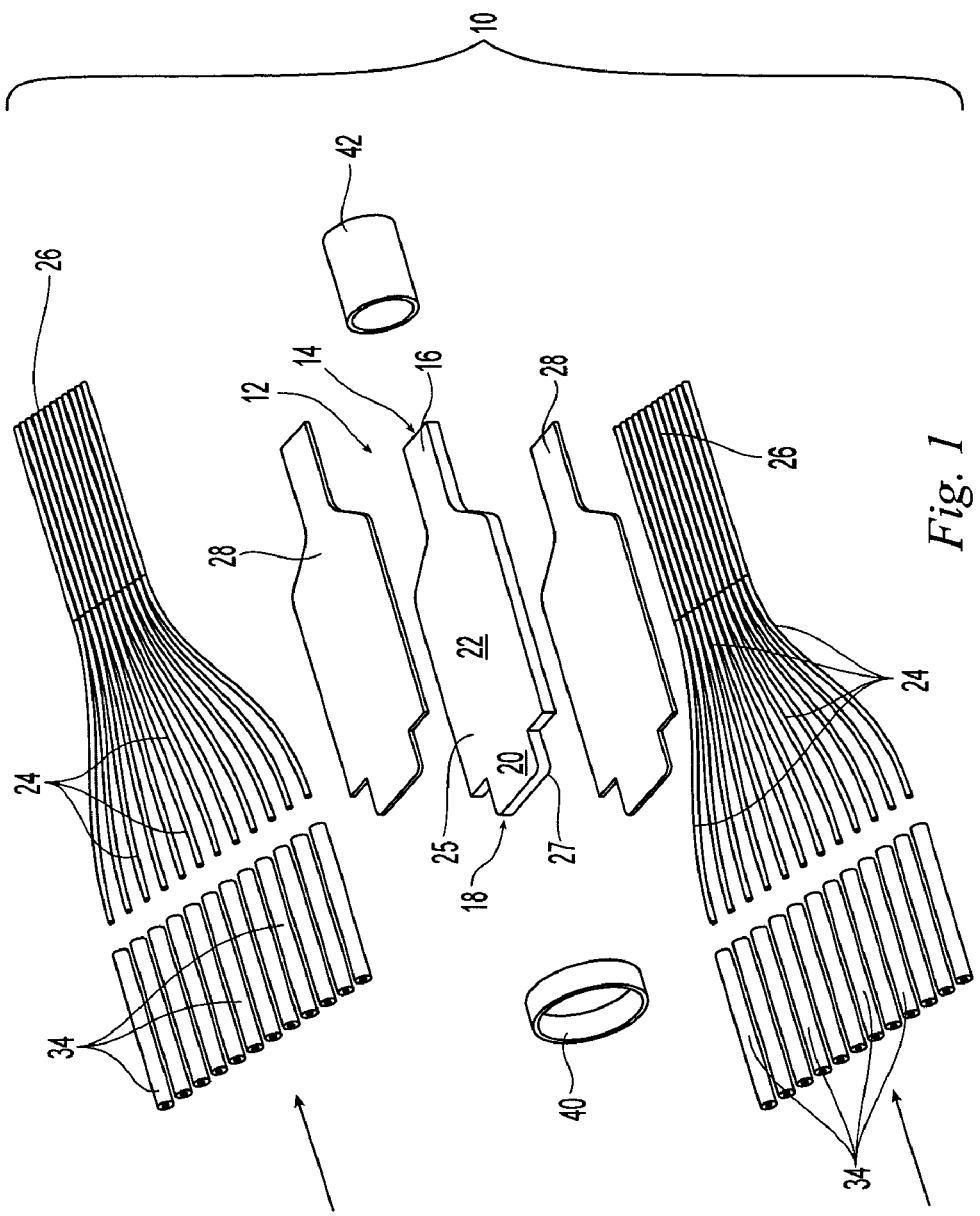
FIG. 1 is an exploded, perspective view of a transition assembly according to one embodiment of the present invention.

A transition assembly 10 according to one embodiment of the present invention is illustrated in FIG. 1. The transition assembly includes a base 12 that is preferably a PCB laminate board, such as FR4, but may be made from any similar type material. The base 12 preferably has a first end 14 with an extension 16 that has dimensions that approximate the width of a 12 fiber optical fiber ribbon (about 4 mm). The base 12 also preferably has a second end 18 with a larger extension 20 that accommodates 12 optical fibers sheathed in 900 µm buffer tubes (about 12 mm). The base 12 has a middle portion 22 that provides for the transitioning of the optical fibers 24 of the optical fiber ribbon 26.

The optical fibers 24 are preferably attached to a first side 25 of the base 12 using an adhesive sheet 28. The adhesive sheet 28 is preferably a Kapton® polyimide film (available from DuPont) with an adhesive on one or both sides of the sheet 28. The optical fibers 24 (both in individual configuration as well as in the ribbon format) are preferably attached to the adhesive sheet 28, which is then attached to the base 12. However, it is possible to attach the adhesive sheet 28 to the base 12 and then attach the optical fibers 24 to the adhesive sheet 28.

The adhesive sheet 28 may be attached to the base 12 with an adhesive attached to the second side (opposite side of the sheet from where the optical fibers 24 are attached) of the adhesive sheet 28 or with an second adhesive, such as Loctite® brand adhesives or an RTV silicone adhesive.

The optical fibers 24 may also be attached directly to the base 12, without the need to have the adhesive sheet 28. The optical fibers 24 could be attached with any appropriate adhesive material.

Turning to the optical fibers 24, the optical fibers 24 are typically provided as an optical fiber ribbon 26. Most optical fiber ribbons that need a transition assembly as in the present invention have 12 optical fibers; however, the present invention relates to any number of optical fibers in the optical fiber ribbon.

In order to transition the optical fibers 24 from the ribbon format to the individual optical fibers, the optical fibers 24 in the optical fiber ribbon 26 are separated from one another along a first portion 30 of the optical fiber ribbon 26. As would be known to one of ordinary skill in the art, the length of the portion 30 depends on the application of the assembly and the use for the optical fibers. This separation typically occurs before the optical fibers are attached to either the adhesive sheet 28 or the base 12. The remaining portion 32 of the optical fiber ribbon remains in the ribbonized configuration. While the individual optical fibers are illustrated to be separated from each other to same point P, they could be separated to different points along the optical fiber ribbon 26 if so desired.

It should also be noted that the optical fibers 24 may all be originally provided as individual optical fibers. The individual optical fibers 24 may then be ribbonized along at least a portion of their length prior to being attached to the adhesive sheet 28 or the base 12 to achieve the same configuration.

Figure 2:
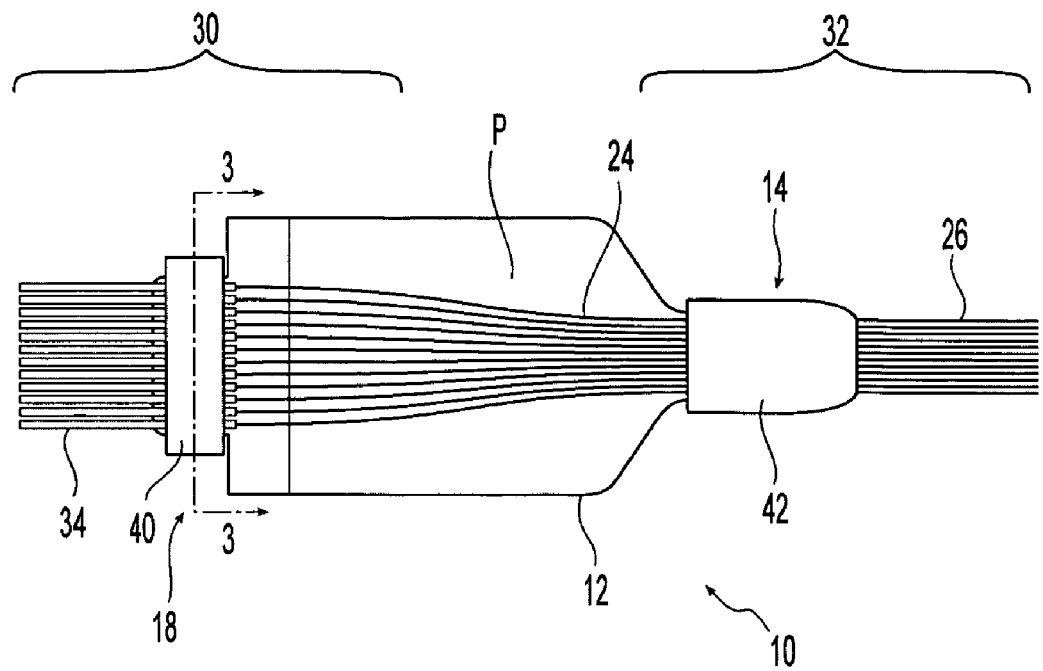
FIG. 2 is a top view of one side of the transition assembly of FIG. 1.
Figure 3:
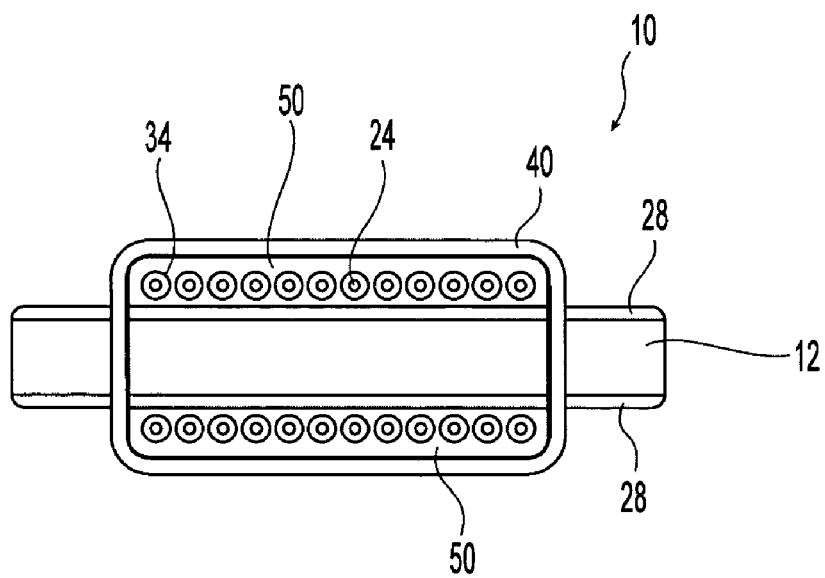
FIG. 3 is cross sectional view of the transition assembly along the lines 3-3 of FIG. 2.

The optical fibers 24 in the first portion 30 are preferably protected by protective tubes 34, which are preferably 900 µm buffer tubes. The protective tubes 34 are slid along a length of the individual fibers 24, which when placed on the base 12 will extend into the second end 18, and more particularly beyond larger extension 20. See FIG. 2. The protective tubes 34 are preferably disposed on each of the optical fibers 24, but the optical fibers 24 may also be bare, i.e, not have any protection.

The optical fibers 24 (and the protective tubes 34) are then attached to the base 12, either with or without the adhesive sheet 28, as explained above. The protective tubes 34 are also preferably secured to the base 12 as well. In addition to the adhesive from the adhesive sheet 28 or the adhesive used directly on the base 12 to attach the optical fibers, a second adhesive is preferably used on the protective tubes 34. Preferably a more robust adhesive, such as the Loctite® brand adhesive, is used to secure the protective tubes 34 to the base 12. The same adhesive is also preferably used to secure the optical fiber ribbon 26 on the extension 16 at first end 14. The same process is also performed for another optical fiber ribbon for attachment to the second side 27 of the base 12.

As illustrated in the figures, a heat shrink element 40,42 is preferably used to further secure the optical fibers on both sides 25,27 at both ends 14,18. This additional securing of the optical fibers to the base 12 helps to prevent the stresses and strains on the optical fibers 24 during installation and use.

Once the optical fibers 24 are secured to the base 12, a protective covering 50 may be used to further protect the optical fibers 24. The protective covering 50 is preferably a conformal coating, which is applied after the protective tubes are disposed on the optical fibers 24 and secured to the base 12. However, if the optical fibers 24 (and any protective tubes 34) are attached to the adhesive sheet 28 before being attached to the base 12, the protective covering 50 may be applied to the optical fibers 24 and/or the protective tubes 34 before the adhesive sheet 28 is attached to the base 12.

Rather than attach both sets of optical fibers to opposing sides 25,27, both sets of optical fibers 24 could be attached to one side of the base 12. For example, one of the sets of optical fibers could be attached to the base 12 directly or with the adhesive sheet 28 as indicated above. The protective tubes 34 may also be applied and secured as noted above. A protective coating 50 may then be applied over the optical fibers 24, or it may be omitted. A second set of optical fibers 24, which were mounted on the second side as indicated above, could then be mounted directed on top of the first set of optical fibers 24, either directly or with an adhesive sheet 28. The protective tubes 34 may also be applied and secured as described above. A protective covering 50 would preferably be applied on the second set of optical fibers.

It will be apparent to those skilled in the art that various modifications and variations can be made to the transition assembly and the method of making a transition assembly without departing from the spirit or scope of the invention. Thus, it is intended that the present invention cover the modifications and variations of this invention provided they come within the scope of the appended claims and their equivalents.

We claim:

1. A transition assembly for optical fibers comprising:
   a base having two sides, the two sides comprising a first side and a second side, the first side facing a first direction and the second side facing a second direction, the first direction being different from the second direction;
   a plurality of optical fibers attached to each of the two sides of the base, the plurality of optical fibers attached to the each side of the base having a first portion being in a ribbon format and a second portion being individual separated optical fibers;
   a plurality of protective tubes, each of the plurality of protective tubes covering at least a portion of a respective one of the individual separated optical fibers; and
   a protective covering applied to each side of the base member and optical fibers.

2. The transition assembly of claim 1, wherein the protective tubes are 900 µm buffer tubes.

3. The transition assembly of claim 1, further comprising an adhesive layer attached to the base and the optical fibers.

4. The transition assembly of claim 3, wherein the adhesive layer is a polyimide sheet having an adhesive on at least one side.

5. The transition assembly of claim 1, further comprising means to secure the optical fibers and optical ribbon to the base.

6. The transition assembly of claim 5, wherein the means is selected from the group including epoxy, glue, and a heat shrink member.

7. The transition assembly of claim 1, wherein the protective covering is a conformal coating.

8. A method of fanning out individual optical fibers in optical fiber ribbons comprising the steps of:
   separating optical fibers at least at portion of a first optical fiber ribbon to create a first length of individual optical fibers and a second length of optical fiber ribbon;
   separating optical fibers along at least a portion of a second optical fiber ribbon to create a first length of individual fibers and a second length of optical fiber ribbon;
   attaching optical fibers from the first optical fiber ribbon to a first side of a base member such that a portion of the first length of individual fibers and a portion of a second length of the optical fiber ribbon is disposed on the first side of the base;

attaching optical fibers from the second optical fiber ribbon to a second side of a base member such that a portion of the first length of individual fibers and a portion of a second length of the optical fiber ribbon is disposed on the second side of the base; and covering the optical fibers with a protective covering.

9. The method of claim 8, further comprising the step of disposing protective tubes on the individual optical fibers.

10. The method of claim 9, wherein the step of disposing protective tubes occurs before the steps of attaching the optical fibers to the base.

11. The method of claim 8, further comprising the step of securing at least a portion of the individual optical fibers and optical fiber ribbon to the base.

12. The method of claim 11, wherein the individual optical fibers and optical fiber ribbon are secured with a heat shrink tube.

13. The method of claim 8, wherein the steps of attaching the optical fibers to the base comprises optical fibers from the first optical fiber ribbon to an adhesive layer and attaching the adhesive layer with the optical fibers attached thereto to a respective side of the base.

14. The method of claim 8, wherein the step of covering the optical fibers occurs before the steps of attaching the optical fibers to the base.

15. The method of claim 8, wherein the optical fiber ribbon along the second portion of the length are ribbonized individual fibers.

16. A transition assembly for optical fibers comprising:
a base having two sides;
a plurality of optical fibers attached to the each of the two sides of the base, the plurality of optical fibers attached to the each side of the base having a first portion being in a ribbon format and a second portion being individual separated optical fibers.
a plurality of protective tubes, each of the plurality of protective tubes covering at least a portion of a respective one of the individual separated optical fibers.

17. A transition assembly for optical fibers comprising:
a base having two sides;
a first plurality of optical fibers attached to one of the two sides of the base, the plurality of optical fibers attached to the one side of the base having a first portion being in a ribbon format and a second portion being individual separated optical fibers;
a second plurality of optical fibers attached to the first plurality of optical fibers, the second plurality of optical fibers having a first portion being in a ribbon format and a second portion being individual separated optical fibers; and
a protective covering applied to the second plurality of optical fibers.

18. The transition assembly of claim 17, further comprising a protective covering applied to the first plurality of optical fibers and disposed between the first and second plurality of optical fibers.

* * * * *

UNITED STATES PATENT AND TRADEMARK OFFICE
CERTIFICATE OF CORRECTION

PATENT NO. : 7,280,732 B2
APPLICATION NO. : 11/074116
DATED : October 9, 2007
INVENTOR(S) : Russell J. Granger and Joseph L. Kaminski It is certified that error appears in the above-identified patent and that said Letters Patent is hereby corrected as shown below:

Column 4, line 56: "separating optical fibers at least" should be changed to --separating optical fibers along at least--

Signed and Sealed this

Fourth Day of December, 2007

JON W. DUDAS
*Director of the United States Patent and Trademark Office*